Figure 1:
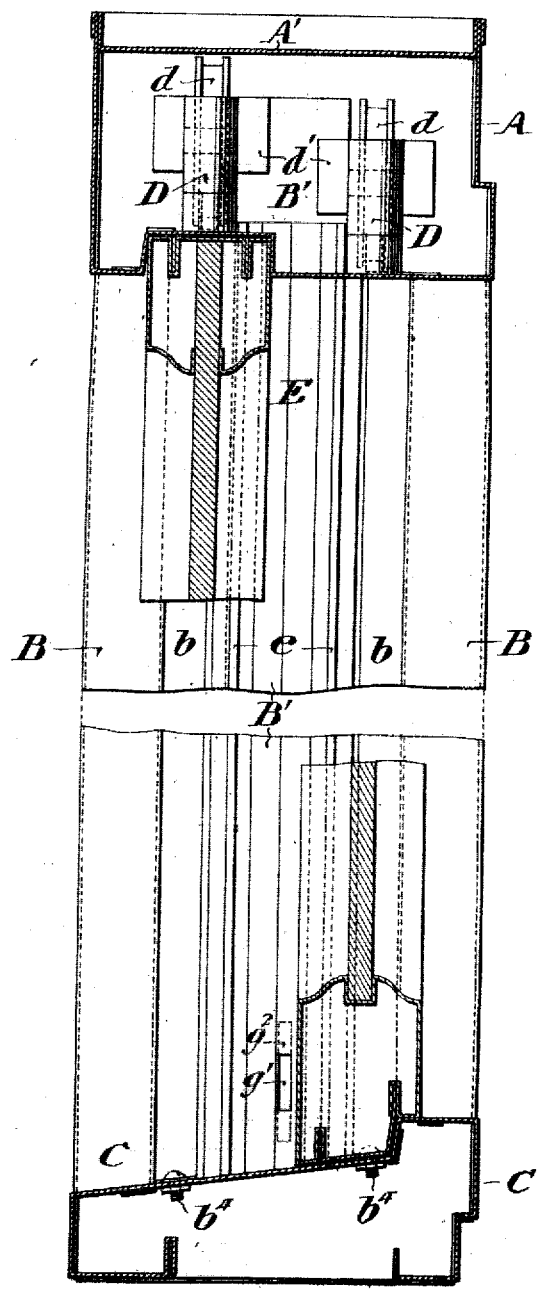

No. 815,772. PATENTED MAR. 20, 1906.
E. T. WILKINSON.
AUTOMATIC FIREPROOF WINDOW.
APPLICATION FILED MAR. 13, 1905.

5 SHEETS—SHEET 1.

WITNESSES:
Clifton C. Hallowell
John C. Bergner

INVENTOR:
ELEAZAR T. WILKINSON,
by his attorneys
Paige Paul & Fraley

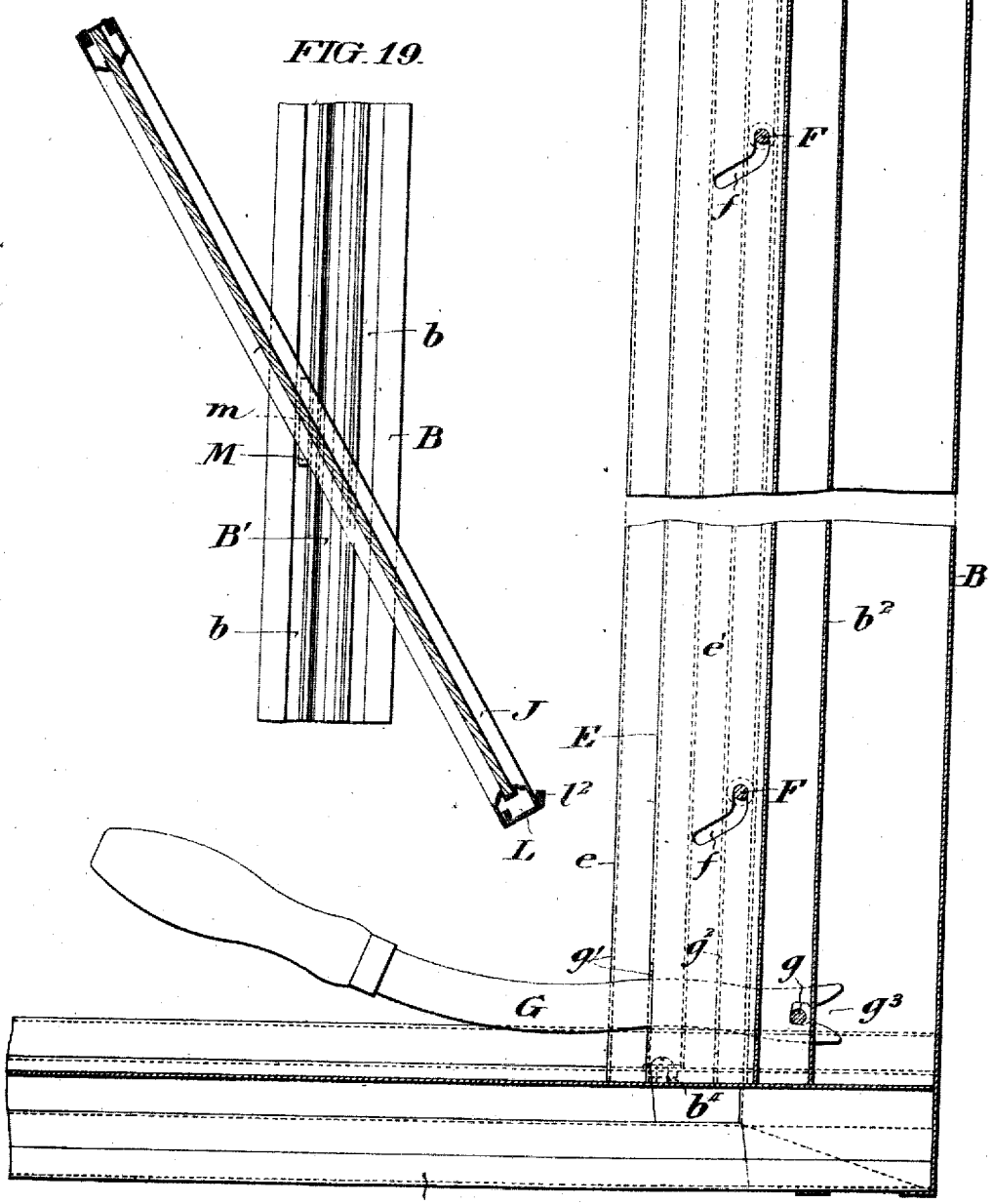

No. 815,772. PATENTED MAR. 20, 1906.
E. T. WILKINSON.
AUTOMATIC FIREPROOF WINDOW.
APPLICATION FILED MAR. 13, 1905.
5 SHEETS—SHEET 3.
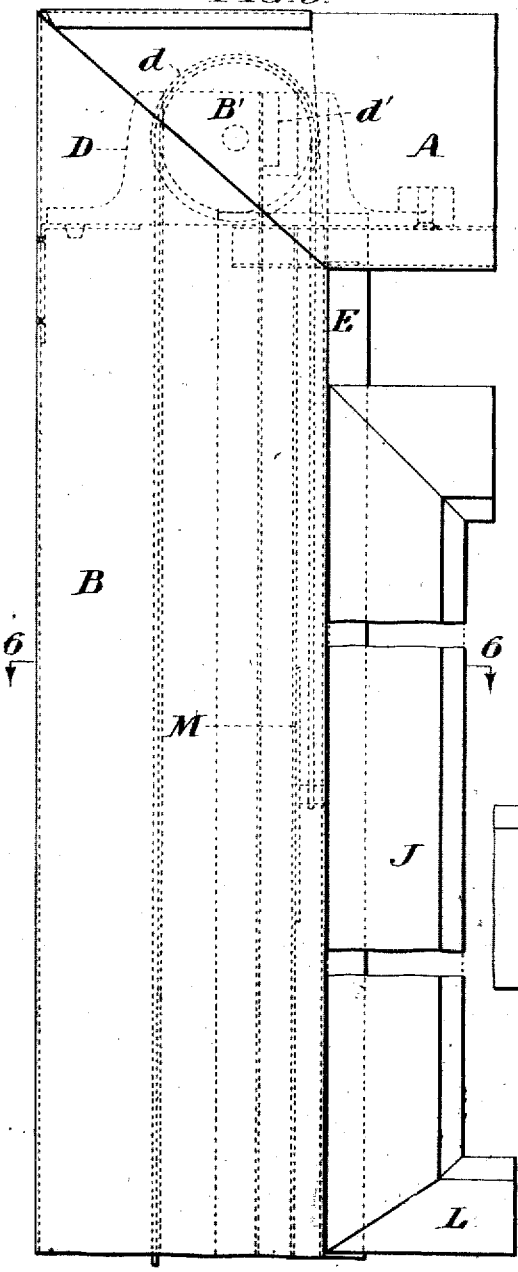
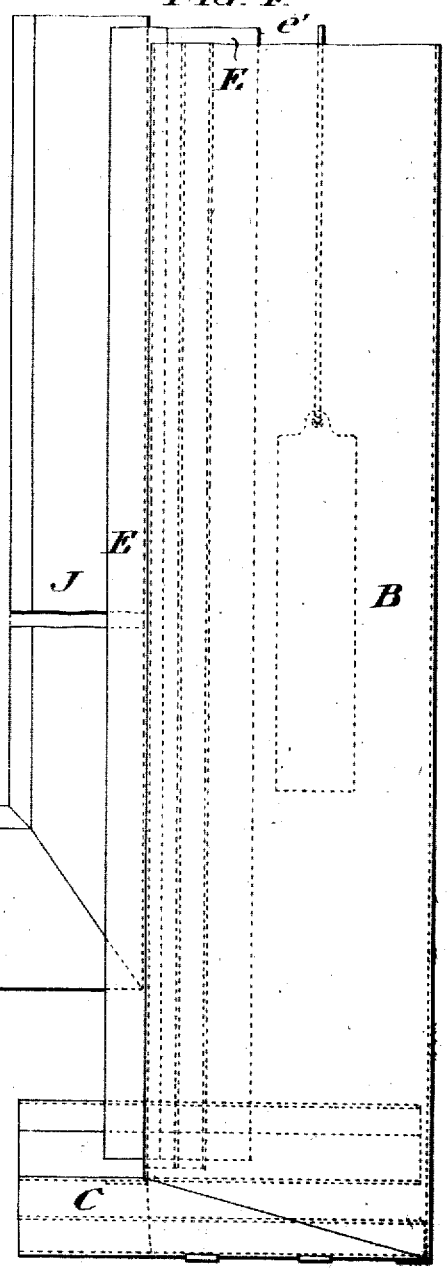
WITNESSES:
INVENTOR:
ELEAZAR T. WILKINSON,

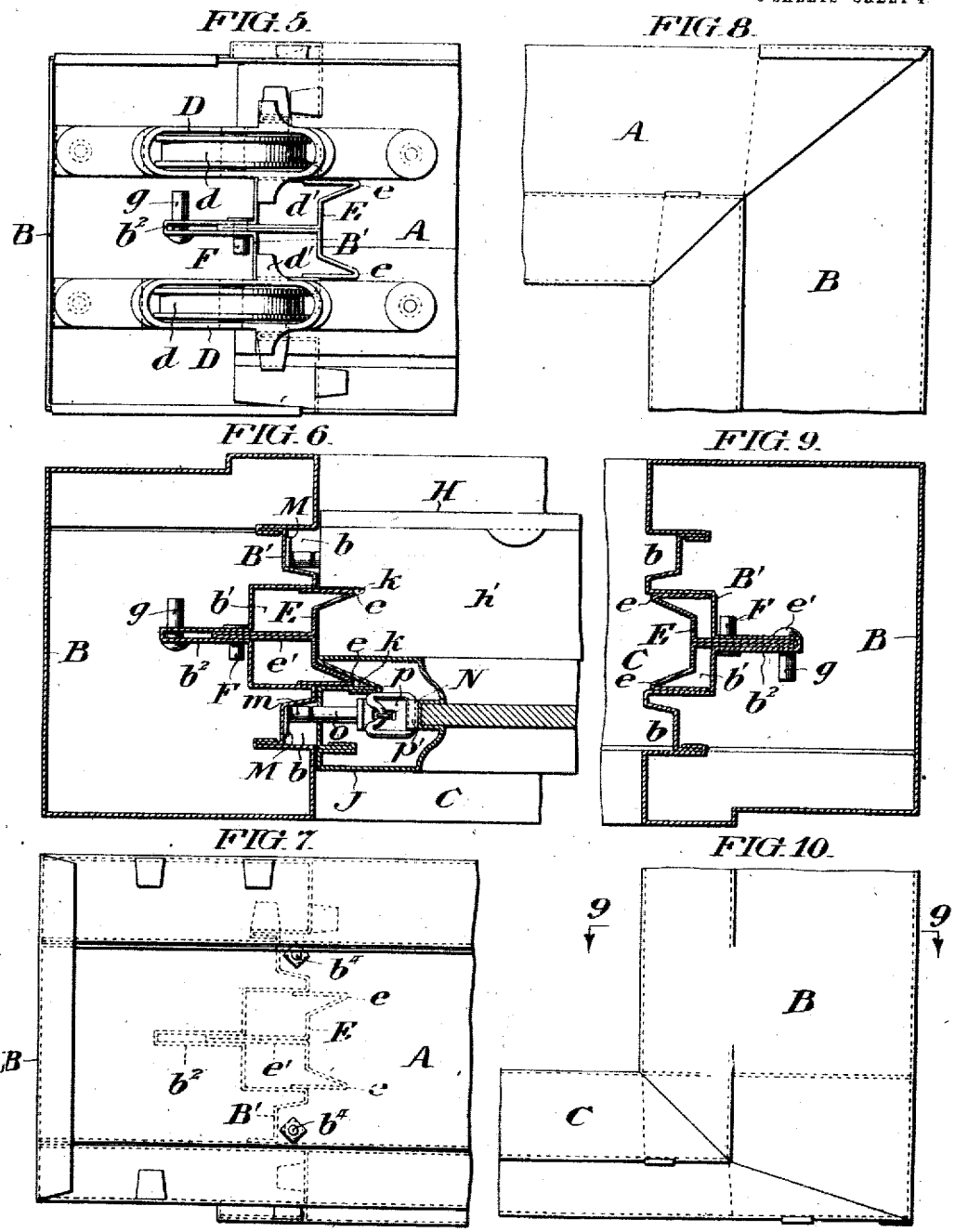

No. 815,772. PATENTED MAR. 20, 1906.
E. T. WILKINSON.
AUTOMATIC FIREPROOF WINDOW.
APPLICATION FILED MAR. 13, 1905.
5 SHEETS—SHEET 5.
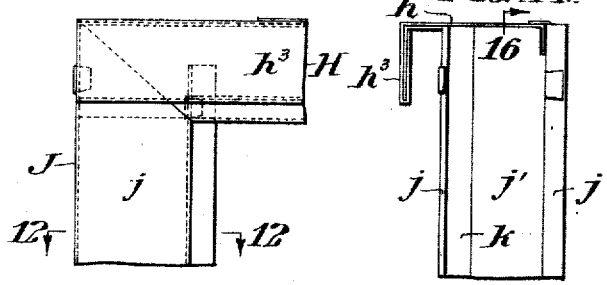
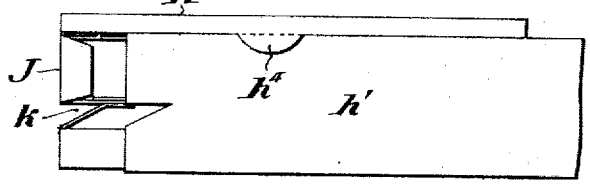
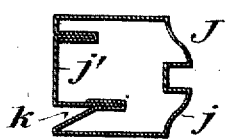
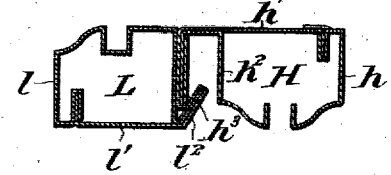
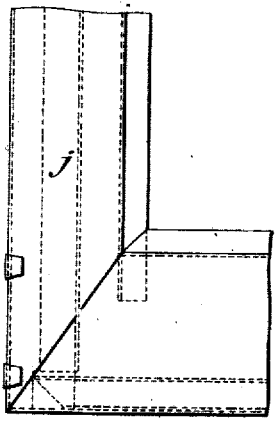
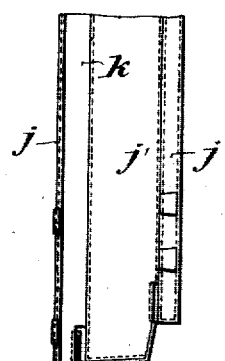
WITNESSES:
Clifton C. Hallowell
John E. Bergner
INVENTOR:
ELEAZAR T. WILKINSON,
by his attorneys
Paige Paul + Foley

UNITED STATES PATENT OFFICE.

ELEAZAR T. WILKINSON, OF PHILADELPHIA, PENNSYLVANIA.

AUTOMATIC FIREPROOF WINDOW.

No. 815,772.      Specification of Letters Patent.      Patented March 20, 1906.

Application filed March 13, 1905. Serial No. 249,764.

*To all whom it may concern:*

Be it known that I, ELEAZAR T. WILKINSON, a citizen of the United States, residing at No. 2022 East Alleghany avenue, in the city of Philadelphia, county of Philadelphia, and State of Pennsylvania, have invented certain new and useful Improvements in Automatic Fireproof Windows, of which the following is a specification, reference being had to the accompanying drawings.

My invention relates to a fireproof window composed entirely of infolded and interlocked pieces of sheet metal and provided with automatic means whereby any undue rise in temperature causes the sashes, if open, to close themselves.

My invention relates also to means for effecting the swinging of the sashes upon a horizontal pivot in such a window, and also their removal, when desired, from the frame. To this end I provide the jambs of the frame with a telescopic or collapsible slide, which when projected forms part of the runway for the sashes, confining them to vertical movement, but which when retracted permits of the swinging or removal of the sashes, as stated.

In the accompanying drawings, Figure 1 is a central vertical cross-section of a window embodying my invention broken away in the center. Fig. 2 is a central vertical longitudinal section of the same, showing only the lower right-hand corner and a part of the right-hand jamb of the frame. Fig. 3 is a front elevation of the upper left-hand corner of the frame, showing also broken portions of the side rail of the upper sash. Fig. 4 is a front elevation of the lower right-hand corner of the frame with broken portions of the side rail of the lower sash. Fig. 5 is a plan view of the upper left-hand corner of the frame with the top plate removed. Fig. 6 is a horizontal section through the left-hand jamb of the frame, showing parts of the two sashes, the section being taken along the line 6 6, Fig. 3. Fig. 7 is an inverted plan view of the lower left-hand corner of the frame. Fig. 8 is an inside elevation of the upper left-hand corner of the frame. Fig. 9 is a horizontal section of the jamb similar to Fig. 6, but with the sashes omitted and the telescopic slide retracted, said section being taken on the line 9 9 in Fig. 10. Fig. 10 is an inside elevation of the lower left-hand corner of the frame. Fig. 11 is an outside elevation of the upper left-hand corner of the lower sash. Fig. 12 is a horizontal section of the left-hand rail of the lower sash, taken along the line 12 12 in Fig. 11. Fig. 13 is an outside elevation of the lower left-hand corner of the lower sash. Fig. 14 is a side elevation of the right-hand side of the upper corner of the lower sash. Fig. 15 is a side elevation of the right-hand side of the lower corner of the lower sash. Fig. 16 is a vertical longitudinal section through the right-hand portions of the lower sash, taken along the line 16 16 of Figs. 14 and 15, and also partly broken. Fig. 17 is a vertical central cross-section through the meeting-rails of the two sashes. Fig. 18 is a partial top view of the meeting-rail of the lower sash with the sliding piece thereof partly withdrawn. Fig. 19 is a central vertical cross-section through the upper sash when swung open, showing part of the left-hand jamb of the frame in relief.

I will first describe the window-frame. It is composed entirely of sheet metal, preferably of galvanized iron, and is built up by the infolding and interlocking of parts without the use of solder or riveting or any other elements of construction liable to be destroyed by intense heat. The construction of the frame is shown in detail in Figs. 1 to 10, inclusive.

The head of the frame is shown in cross-section in Fig. 1, and consists mainly of the piece A, bent, as shown, to form the front, back, and bottom or facing, the latter having a seat for the top sash. The upper ends of the piece A are united by another piece A', which forms the top of the head of the frame, the union being effected by interlocking along the edges, as shown.

Each jamb is composed chiefly of the piece B, folded so as to form the front, back, and outside of the jamb, as well as part of the grooves of the inside or facing. The remainder of the jamb—that is to say, the portion which faces the sashes—is formed of a piece B', the edges of which enter a fold along the edges of piece B. It is bent so as to form runways $b\ b$ for the shoes of the sashes, and also a deep central seat $b'$ for the telescopic slideway. Along the median line of this seat the piece B' is bent to form a deep hollow fold $b^2$, the functions of which will hereinafter be described. The pieces B of the two jambs are united to the piece which forms the head of the frame by means of a series of interlocking flaps and slots, the details of which are sufficiently apparent from the drawings and need not here be described.

The sill of the frame is composed of the piece C, Fig. 1. It is also united at its ends with the lower ends of the pieces B of the jambs by a series of interlocking flaps and slots, as shown.

The pieces B' B', which form the facings of the jambs, are not interlocked at their ends, as are the other pieces mentioned, but are removably constructed and attached in order that when needed access may be had to the interior of the jambs. For this purpose the upper ends of each piece B' project partly above the level of the bottom of the head of the frame, passing up through an opening cut therein, as seen in Fig. 5, but are not otherwise fastened thereto. The lower ends of these pieces are detachably fastened to the top of the sill-piece by the screws $b^4 b^4$, Figs. 1, 2, and 7. By removing these screws the piece B' may be drawn forward, its edges withdrawing themselves from the folded edges of piece B and taken out of the frame altogether.

At the top of each jamb there are supported pulley-blocks D, carrying pulleys $d$, the support being effected partly from the lower side of the head of the frame and partly from a shoulder-piece $d'$, attached to the interior side of the jamb.

E is a telescopic slideway formed of a single piece of sheet metal folded, as shown in the drawings, so as to present two parallel projecting beads $e\ e$. These beads are formed by folding the metal at an acute angle, and preferably so that the outer edges of the beads are parallel, while their inner edges are inclined toward each other, as shown. The slideway has a median fold $e'$, which forms a sort of a web entering and sliding freely within the hollow fold $b^3$ of the piece B'. The telescopic slideway thus formed is capable of lateral projection and retraction within the seat $b'$. For the purpose of guiding this movement two or more cross-pins F are inserted across the fold $b^3$ of the piece B' of the jamb, as seen in Figs. 2 and 6. Corresponding slots $ff$ are cut in the fold $e'$ of the piece E, the slot presenting both an inclined portion and a vertical portion, as shown. Near the bottom of the jamb a projecting pin $g$ is set in the hollow fold $b^3$. Near this a rectangular slot $g'$ is cut through the facing of the piece E. There is also a somewhat longer slot $g^2$ cut opposite the slot $g'$ through the piece B'. A handle-bar G has its lever-arm of such shape as to pass conveniently through slot $g'$, while at its end there is formed an undercut notch $g^3$, capable of fitting upon the projecting ends of pin $g$ when the handle-bar is thrust inward through slots $g'$ and $g^2$. The pin then forms a fulcrum upon which the lever works, and by raising the handle of the lever the entire telescopic piece E will be moved upward, the motion being permitted by the slots $f$. At the same time the inclined direction of these slots will cause the retraction of the slideway into the jamb until it occupies the position shown in Fig. 9, where it will be noted that its two parallel beads $e\ e$ are withdrawn within the jamb. The reverse motion of the handle-bar G effects the projection of the slideway to the position of Figs. 2 and 6, the vertical portions of the slots $f$ having a locking effect, so as to prevent any directly horizontal pressure, such as might be caused by sidewise movement of the sashes, from pushing back the slideway.

Figs. 11 to 16, inclusive, together with the portions shown in section in Fig. 1, sufficiently illustrate the construction of the lower sash. The sash-rails are formed by interlocking pieces of sheet metal, as shown. The top or meeting rail H of the lower sash appears in section in Fig. 17. It is composed of three pieces—the piece $h$, forming the inside, the piece $h'$, forming the top, and the piece $h^2$ the outside of the rail. The opposing edges of pieces $h\ h^2$ have a space between them to afford a slot for the introduction of the pane. The piece $h'$, in addition to forming the top of the meeting-rail, is bent outwardly and downwardly in such a way as to form in connection with the interfolded edge of the piece $h^2$ a flap $h^3$, which, when both sashes are closed locks with a corresponding flap formed on the meeting-rail of the top sash, thus producing a very tight joint across the center of the window. The piece $h'$ is held in place only by the interfolding of its edges with the corresponding parts of the pieces $h$ and $h^2$, aided by flaps $h^4$, formed by bending out part of the metal forming the upper edge of piece $h$, as seen in Fig. 18. It results from this construction that when the sash is removed from the window-frame the piece $h'$ may be slid endwise entirely off the sash, giving free access to the interior of the rail for the purpose of the insertion or removal of the pane.

The construction of the side rails J of the sashes is best illustrated in the horizontal section seen in Fig. 12, where it will be noted that the front, back, and molding of the rail is formed of a piece $j$, which includes the groove for the pane. The remainder of the side rail is formed by the piece $j'$, which interlocks along the edges with the piece $j$. The peculiarity in the shape of the resulting side rail is the deep reëntrant angle $k$ produced along the edge of the side rail in a position corresponding to one of the beads $e$ of the telescopic slideway E, so that when the latter is projected it engages this reëntrant angle, compelling the sash to run in a vertical direction upon it. The sides of this reentrant angle are made to correspond in inclination to those of the bead of the slideway which is to enter it.

The upper sash is formed substantially as is the lower sash, except that the reëntrant angle formed in the side rails is in reversed position, as best seen in Fig. 6. In this way the two sashes are both held in vertical relation to the slideway when it is projected. Furthermore, by reason of the inclination of the inner edges of the beads on the slideway, its projection draws the two sashes closer together and when in its fully-projected position holds them so as to bring the meeting-rails into close proximity. The top rail of this sash has a top piece which slides sidewise like the piece $h'$ of the meeting-rail of the lower sash.

The meeting-rail L of the upper sash is shown in Fig. 17. It consists of but two pieces, the piece $l$ forming the sides and molding with the groove for the pane and the piece $l'$ forming the bottom and also the angular flap $l^2$, produced by the interfolded parts of the edges of the two pieces, which interlocks with the corresponding flap of the meeting-rail of the lower sash.

Both sashes are hung by chains passing over the pulleys $d\ d$ and counterweighted upon the ends of the chains inside of the jambs, with, however, the peculiarity that the upper sash is overweighted and the lower sash underweighted, so that unless otherwise restrained both sashes tend to close themselves. The deep fold $b^2$ of each of the pieces B' serves to form a partition which keeps the two weights which occupy each jamb separated from each other. It may here be noted that the seat in the jamb for the telescopic slideway being completely inclosed no motion of the slideway can affect or in any way interfere with the motion of the weights.

The width of the sashes is such that when the telescopic slideway of the jambs is retracted, as seen in Fig. 9, the sashes can pass freely through the space between the jambs. Both sides of both sashes are, however, provided with a friction device or friction-shoe, one of which, as seen in Fig. 16, is attached approximately centrally to each side rail. This consists of a shoe M, with a central boss $m$, pivoted to the cross-bar $o$, inserted in the side of the sash. The chains upon which the sashes are hung are fastened to the bosses $m$.

The inner end of each cross-bar $o$ is attached to a long flat metal spring $p$, which runs down the interior of the side rail of the sash nearly centrally and is near the bottom deflected toward the inner edge, against which it finds its point of attachment. The normal pressure of this spring tends to force the shoe M outwardly against the side of the jamb, but not in itself with sufficient pressure to hold the sash in an opened position against the countervailing tendency of the overweight or underweight, as the case may be. In order to increase the pressure of this spring sufficiently to enable it to hold the sash in any position in which it is set, there is provided a link $p$, pivoted against the inner edge of the sash-rail at $p'$ and having its free end bearing against the extended upper end of the flat spring $p$. To this link P is attached a long rod N, which reaches down to near the bottom of the sash-rail, where it is attached to a nut $n$ upon a screw $n'$, the head of which is seated in a countersunk cap $n^2$ in the bottom edge of the lower rail of the sash, where it may be turned for adjustment from the outside. By sufficiently tightening this screw the rod N may be drawn down so as to cause the link P to press against the spring $p$ sufficiently to force the shoe M outwardly with such pressure as to maintain the sash in position. Within the cap $n^2$ a fusible block Q is inserted between the end of the cap and the head of the screw. There is also a coiled spring $q$ interposed between the end of the cap and the nut $n$. If now by reason of heat the fusible block Q melts, the pressure of the spring $q$ immediately forces the rod N and the link P upward, thus releasing the shoe M from that pressure which maintained the sash in its open position and allowing it to rise or fall to its closed position, thus in case of fire effecting the immediate closure of all open windows in a building fitted with my invention.

It will be observed from Fig. 6 that the shoes M are projected by the springs $p$ into the runways $b$, formed in the faces of the jambs. In this way the sashes are normally subject to double control in their vertical movement—namely, that resulting from the projection of the telescopic slideway into the reëntrant angle of the side rail of the sash and that resulting from the projection of the shoes into the runways of the frame. For the purpose of swinging the sash for cleaning or other purposes, as shown in Fig. 19, the telescopic slideway is retracted by means of the handle-bar G, as a result of which both sashes are rendered free to swing upon the pivots of the shoes which they carry. When thus swung to a horizontal position, it is easy to remove the sash from the frame altogether by raising one side more than the other, which causes the shoes to slip out of their runways.

Having thus described my invention, I claim—

1. In a metallic window the combination of sashes fitted at their sides with projecting shoes; pivotal connection between said shoes and sashes; runways formed in the facings of the jamb and receiving the shoes; and a telescopic slideway movable within said facing between the runways but forming no part thereof, which slideway when projected engages the sashes and when retracted is wholly free therefrom, substantially as described.

2. In an automatically-closing non-combustible window, the combination of the jamb having runways formed thereon, and also a collapsible slideway telescoping therein; sashes fitted with projecting shoes entering the runways; pivotal connection between said shoes and the sashes; an overweight for the upper sash, and an underweight for the lower sash; grooves in the sides of the sashes which are engaged by the collapsible slideway when projected and freed from it when retracted; means for causing the shoes to normally exert pressure effective to maintain their sashes in open position; and a fusible plug by the melting of which under the influence of undue heat said effective pressure upon the shoes is released, and the sash is allowed to automatically close, substantially as described.

3. A metallic window-sash, having a rail formed of sheet-metal pieces, the inside and outside pieces having a space between their edges for the insertion of the pane; in combination with an edge piece which is united to the other two only by the interfolding of their edges, and held in place by flaps bent out from the side pieces, whereby it is capable of being slid endwise out of the sash for the purpose of removing or inserting a pane, substantially as described.

4. In a sheet-metal window, a jamb with a weight-space; a seat occupying a median position in the facing of the jamb, having sides and back which completely separate it from the weight-space; two sashes; and a single telescopic slideway fitting said seat and capable of projection therefrom; said slideway when projected engaging both of the sashes, and when retracted not entering the weight-space, substantially as described.

5. The combination with revolving window-sashes, of a duplex telescopic wind-stop and guideway-strip located in a central vertical groove of the face of each window-frame stile and having a rib for each sash respectively, said sashes respectively grooved for coaction therewith, and means for telescopically adjusting the stops, substantially as described.

6. The combination with revolving window-sashes, of frame-stiles having a central vertical stop-groove, duplex telescopic wind-stop and guideway-strips located in said grooves and having a rib along each edge of the face, and sash-stiles having a groove in the face coacting with the ribs of the guideway-strip respectively, said grooves being in the edges of said faces contiguous to the plane of the center of the guideway-strips substantially as described.

In testimony whereof I have hereunto signed my name, at Philadelphia, Pennsylvania, this 11th day of March, 1905.

ELEAZAR T. WILKINSON.

Witnesses:
 JAMES H. BELL,
 E. L. FULLERTON.